S. KRAUSER.
Liquid Measure.

No. 15,853.

Patented Oct. 7, 1856.

UNITED STATES PATENT OFFICE.

SAML. KRAUSER, OF READING, PENNSYLVANIA.

METHOD OF MEASURING FLUIDS WHILE DRAWING.

Specification of Letters Patent No. 15,853, dated October 7, 1856.

*To all whom it may concern:*

Be it known that I, SAMUEL KRAUSER, of Reading, in the county of Berks and State of Pennsylvania, have invented certain new and useful Improvements in Drawing and Measuring Liquids; and I do hereby declare the following to be a full, clear, and exact description of the same, reference being had to the accompanying drawings, making a part thereof, in which—

Figure 1:
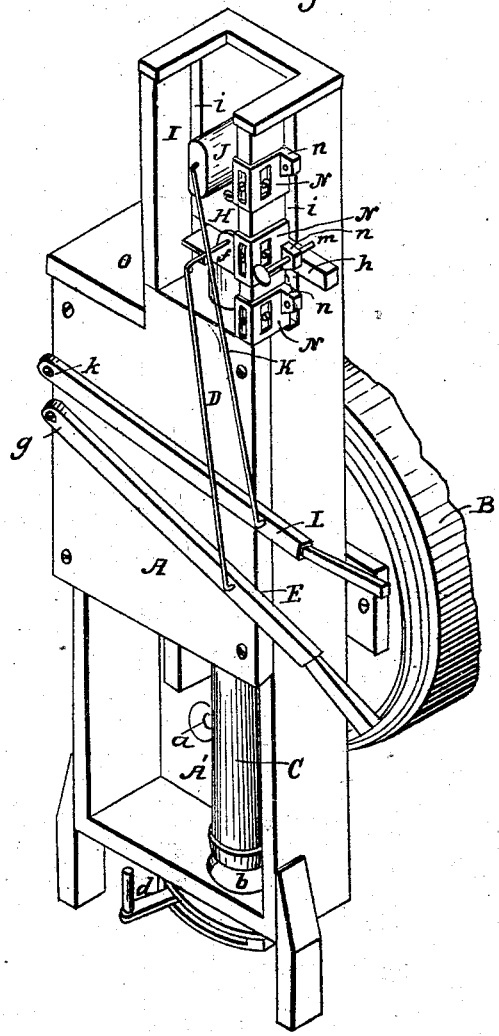
Figure 2:
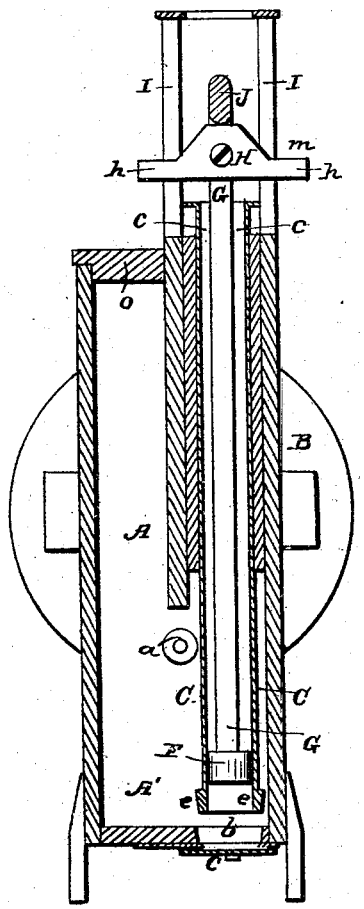

Figure 1 represents in perspective the measuring and drawing apparatus, connected to a cask. Fig. 2 represents a vertical section through the apparatus.

Similar letters of reference where they occur in the separate figures denote like parts of the apparatus.

The nature of my invention relates to a manner of separating a given measured quantity of liquid from a mass, and drawing said separated measured quantity from said mass, with the greatest exactitude and facility.

To enable others skilled in the art to make and use my invention I will proceed to describe the same with reference to the drawings.

A, represents a case or receiver, attached to end of any ordinary cask B, which contains the liquid to be measured and drawn off. There is an opening $a$ between the interior of the cask B and the well (A') of the receiver, so that the whole of the contents of the cask may be measured and drawn off, and so that the measured quantity may be separated from a mass, or the bulk of the liquid, which admits of an instantaneous operation, even in very thick or sluggish liquids. By placing the measuring and drawing apparatus in such position as to be surrounded by the liquid, or so as to pass or travel through a large column of fluid, it divides and separates from the mass, by a thin metallic tube, a given quantity, which can be immediately ejected from said measuring tube as will be now described.

In the bottom of the receiver A, is an opening $b$, and a slide or cut-off valve $c$, having a handle $d$, attached, is so arranged, as to open or close said hole $b$, as occasion may require. Within the receiver A, is a tube C, made of any thin metal, so as to readily pass through a mass of liquid, without much displacement thereof. Upon the bottom of this tube may be arranged a packing $e$, of any suitable kind which should fit snugly into the hole $b$, so as to prevent the flow of any liquid through the joint between them. To the top $f$ of this tube, which projects above the highest point at which the fluid would rise in the receiver, is connected one end of a rod D, the other end of said rod D, being attached to a lever E which is pivoted at $g$, to the outside of the case A. It might be proper here to add, in relation to Fig. 1, that the under part of the front side of the case is represented as removed, to show the interior; and for the convenience of getting at the interior of the case, should it at any time get clogged, or for any other convenience said under part may be made removable, but with tight joints when in place.

Within the tube C, is a plunger F, packed so as to snugly fit therein "water tight," with a rod G, connected thereto, which rod extends upward, and has at or near its top a cross-head H, the ends $h$, of which move up and down through slots $i$, $i$ in the two upright pieces I I. To an arm J, on the top of the rod G, is attached one end of a rod K the other end of said rod being connected to a lever L which is pivoted at $k$, to the outside of the case A. By means of the levers E, L, and the rods D, K, respectively connected to the tube C, and plunger rod G, either can be operated independently of the other.

On one of the upright pieces I, are arranged the gage plates N, N, N, having slots therein, through which set screws pass, as shown in Fig. 1, so that they may be properly adjusted on said piece I. On these gage plates are also made lugs $n$, through which a pin $m$, may pass, so that as the cross head or its projecting end $h$, is raised up, it will come in contact with said pin, which may designate a pint, quart, gallon, or any other given quantity, and to either of which marks or quantities the said pin may be set. The height of the plunger, or the distance it moves up until stopped by the pin $m$, regulates also the height to which the tube C, can rise, as the said tube when it rises to the underside of the cross head can go no higher, and thus the gage to the plunger becomes incidentally the gage also to the tube.

O, is a cover, which can be removed at any time to inspect the height of the liquid within the receiver A.

The operation is as follows: The pin *m* being first properly placed for the quantity which it is desired to measure and draw, and the valve *c* being over the opening *b*, the tube and plunger are raised up by their levers, and then the tube is brought down to its seat, and the quantity which it cuts off, or separates from the mass of liquid in passing through it, and which it contains between the plunger F, and the valve plate *c*, is the measured quantity for which the pin *m* was set. Then open the valve *c*, and that measured quantity and no more, will run out, if it is a thin liquid, but if sluggish liquids or fluids are to be drawn, then the plunger F, can be brought down by its lever, and the measured quantity is forced out, and thus the operation can be repeated, and the quantities changed at pleasure.

Having thus fully described the nature of my invention, what I claim therein as new, and desire to secure by Letters Patent is—

1. Severing or separating a given quantity of liquid from a mass or column, by a traveling tube, and plunger, operating together substantially as herein set forth.

2. I also claim the gage plates N, N, N, in combination with the valve seat or packing of the plunger fitting thereto, for adjusting the measuring apparatus to the exact quantity to be drawn substantially as specified.

SAML. KRAUSER.

Witnesses:
 WM. B. SCHOENER,
 JACK SCHOENER.